Patented Jan. 29, 1952

2,583,527

UNITED STATES PATENT OFFICE 2,583,527

STABILIZING POLYDIOLEFIN SULFONES

Johan Michael Goppel and Gottfried Ernst Rumscheidt, Amsterdam, Netherlands, assignors to Shell Development Company, San Francisco, Calif., a corporation of Delaware No Drawing. Application April 15, 1949, Serial No. 87,848. In the Netherlands May 18, 1948

15 Claims. (Cl. 260—779)

1

This invention is directed to a process for the stablization of products formed on reacting inorganic acidifying compounds with rubbery polymers comprising high molecular weight, polyunsaturated compounds. The invention also relates to the resulting stabilized reaction products.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, its homologues and derivatives, with other unsaturated organic compounds. Among the latter are the acetylenes, as vinyl acetylene, the olefins, as isobutylene which copolymerizes with butadiene to form butyl synthetic rubber; the vinyls, as vinyl chloride, acrylic acid, acryonitrile (which polymerizes with butadiene to form the synthetic rubber Buna-N), methacrylic acid, and styrene, the latter compound polymerizing with butadiene to form the synthetic rubber Buna S; as well as the vinyl esters and various unsaturated aldehydes, ketones and ethers, e. g., acrolein, methyl isopropenyl ketone, and vinyl ethyl ether. The above-defined, polyunsaturated, high molecular weight compounds, including both natural and synthetic rubbers, may properly be termed "high molecular weight polymers of diene-hydrocarbons," or preferably, "rubbery polymers of at least one compound selected from the group consisting of the conjugated diolefines and chloroprene."

As employed herein, the term "inorganic acidifying compound" embraces the various inorganic acids and acid anhydrides wherein the acid-forming element (as sulfur, nitrogen or phosphorus, for example), if possessing several

2 valencies, is present, in a valency other than the highest thereof. Preferred acidifying compounds are the acid anhydrides sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the most preferred compound for employment in the present invention is sulfur dioxide.

It is known that the high molecular weight polyunsaturated compounds lend themselves well to the production of various shapes, including those of a continuous, non-supported nature, as filaments, rods, strips, sheets, and the like. Furthermore, it is known that the properties of such shapes may be improved by reacting the unsaturated, high molecular weight compound with one or more of the inorganic acidifying compounds mentioned above, particularly sulfur dioxide. The exact nature of this reaction is not clearly understood, though it is evident that a quantity of the acidifying ingredient is taken up in one form or another by the high molecular weight reactant. The extent of this reaction is normally measured by, and expressed in terms of, the amount of acid-forming element (sulfur, phosphorus or nitrogen, for example) present in the resulting reaction product.

It has also been possible to improve the nature of the foregoing reaction products by incorporating therein, normally prior to the reaction with sulfur dioxide or other acidifying ingredient, a quantity of a low molecular weight, unsaturated compound. The resulting reaction product has a number of advantages, chief among which is a greatly improved acceptance for all the commonly employed dyestuffs. Representative unsaturated compounds which may be employed in this manner, all of which have a molecular weight of below 5,000, are alkadienes such as butadiene and 1,5-hexadiene, and alkenyl compounds such as allyl alcohol, allyl chloride, allyl acetate, allyl capronate, allyl isothiocyanate, allyl oleate, and more especially, diallyl compounds such as diallyl phthalate and diallyl adipate. The method by which unsaturated reactants of both high and low molecular weight are utilized in forming reaction products with acidifying compounds forms the subject of copending application, Serial No. 15,048, filed March 15, 1948, and reference is hereby made to said application for a more complete description of the invention there disclosed.

It should be noted that while the high molecular weight polyunsaturated compounds, or mixtures of both high as well as low molecular weight unsaturated compounds, may be reacted with the acidifying compound without prior modification of either reactant, improved results are obtained when the unsaturated compounds are first activated by treatment with a hydroperoxide such as decalin hydroperoxide, tetralin hydroperoxide, or ethyl benzene hydroperoxide. Activation methods of this nature are disclosed in copending applications, Serial Nos. 760,924, filed July 14, 1947, now U. S. Patent No. 2,469,847, and 788,312, filed November 26, 1947, now Patent No. 2,558,498; to which applications reference is here made. The peroxide treatment is also disclosed in copending application Serial No. 15,048, referred to above, as said activation treatment relates to mixtures of high and low molecular weight unsaturated reactants.

While the reaction products discussed above have proven well adapted for many uses, they have proven particularly useful when formed into filaments of the type which can be woven into textiles, either alone or in conjunction with fibers of other materials. Thus, filaments produced by spinning a peroxide-activated rubber solution into a sulfur dioxide-containing coagulating bath have a high elementary denier, with good tensile strength, a relatively high degree of elongation prior to rupture, and good flexibility and other characteristics making for ease of working and handling. In view of these many favorable qualities, it has been highly disappointing to realize that even in the case of the best reaction products hitherto obtainable, deterioration of the filament or other shape with age, heating and/or exposure to ultra-violet light is unduly rapid. This deterioration is manifested in a variety of ways, but chiefly in a sharp falling off in tensile strength and in the degree of permissible stretch prior to rupture. In many instances undesirable color changes also ensue. These various changes are greatly speeded up as the objects under consideration are heated, particularly above 100° C., or are exposed to ultra-violet or other light rays. It has been observed that the deterioration in physical properties is attended by a loss of sulfur dioxide or equivalent acid constituent from the reaction product, a loss which is generally proportional to the aforementioned deterioration. Accordingly, the rapidity with which a given product loses its acid constituent may also be taken as a measure of its stability, i. e., its resistance to deterioration with age, heating, and/or exposure to light.

It is an object of the present invention to provide a method for obtaining stable products of the type formed on the reaction of the above-identified, high molecular weight, polyunsaturated rubbery polymers with inorganic acidifying compounds. A more particular object is to provide reaction products of this character which are stable even when aged or heated, and particularly on being exposed to ultra-violet or other light rays. A still further object is to provide filaments and like continuous, non-supported shapes composed of said stabilized reaction products which are characterized by a continued high tensile strength and a high degree of stretch prior to rupture, as well as by a relatively small loss of acidifying compound, when aged, heated and/or exposed to light rays.

The nature of still other objects of the invention will become apparent from a consideration of the following description.

It has been discovered that excellent stability characteristics, particularly as regards resistance to deterioration under the influence of ultra-violet light, may be imparted to otherwise unstable products of the type formed on the reaction of high molecular weight, polyunsaturated rubbery polymers with inorganic acidifying compounds, by incorporating in said products one or more compounds selected from the group consisting of aromatic acids and thio acids, their anhydrides, esters and salts. More specifically, these stabilizing additives are those which contain at least one condensed or non-condensed aryl nucleus and at least one carboxyl group which preferably is esterified and which may or may not be substituted with sulfur or linked to a metal to form a salt. The said carboxyl group can be linked to the aryl nuclei either directly or by means of an aliphatic group.

As examples of aromatic acids and acid anhydrides which are useful in the process of this invention there may be mentioned benzoic acid, alpha-naphthoic acid, beta naphthoic, salicyclic acid, 3,5-diisopropylsalicyclic acid, phthalic acid, naphthalic acid, phenylacetic acid, hydrocinnamic acid, cinnamic acid, homophthalic acid, and phthalic anhydride. Exemplary sulfur-substituted aromatic acids and acid anhydrides are thiobenzoic acid, thionaphthalic acid, monothiophthalic acid, dithiophthalic acid, and thiophthalic acid anhydride.

Representative esters which may usefully be incorporated in the described reaction products in order to stabilize the same are phenyl-o-hexadecoxybenzoate, phenyl salicylate, ethyl salicylate, 4-allylphenyl salicylate, 2,4-diallylphenyl salicylate, 2,4,6-triallylphenyl salicylate, methyl benzoate, benzyl benzoate, phenyl benzoate, phenyl 3,5 - diisopropylsalicylate, ethyl naphthoate, phenyl naphthalate, diallylphthalate and the butyl and phenyl esters of phenyl acetic acid.

Exemplary salt additives useful in stabilizing the described reaction products are zinc 3,5-diisopropylsalicylate, calcium 3,5-diisopropylsalicylate, sodium benzoate, potassium salicylate, calcium salicylate, zinc naphthalate and magnesium salicylate. Also included are those internal salts formed by closing the ring between a bivalent metal, as calcium or zinc, attached to the carboxyl group and the oxygen of the hydroxyl group in compounds such as salicylic acid and its derivatives. These compounds may be formed, for example, from the normal salicylates of bivalent metals by heating, in which process the corresponding phenol and carbon dioxide are split off.

A preferred group of stabilizer compounds is that made up of salicylic acid, its esters and salts, and the esters and salts of hydrocarbon-substituted salicylic acids as well as the latter acids themselves. The term "hydrocarbon-substituted salicylic acids" is here employed to designate such compounds as 3-phenyl salicylic acid, 3-ethyl salicylic acid, and 3,5-diisopropylsalicylic acid, for example, wherein one or more of the hydrogen atoms attached to the salicylic acid nucleus is replaced by a monovalent hydrocarbon radical. Thus, in addition to the named salicylic acids, exemplary compounds coming within this preferred group are ethyl salicylate, phenyl salicylate, isopropylsalicylate, zinc salicylate, calcium salicylate, magnesium salicylate, zinc 3,5-diisopropylsalicylate, calcium 3,5-diisopropylsalicylate, phenyl 3-ethylsalicylate, and calcium 3-phenylsalicylate.

The foregoing aromatic acids and their described derivatives may be employed either alone, in combination with one another, or in combination with stabilizer compounds of still other classes. Among the latter may be mentioned urea-type compounds such as urea, thiourea, guanidine, N,N'-diphenyl urea, and N,N'-diphenyl thiourea, whose stabilizing function is described in copending application, Serial No. 34,506, filed July 3, 1948, now Patent No. 2,521,306; amines and amine salts, representative compounds of the latter type, as described in copending application Serial No. 889,301, filed April 26, 1949, being hexamethylenetetramine, melamine, heptadecylamine, benzyl amine, and the like; and amides such as dicyandiamide, acetamide, zinc dimethyldithiocarbamate, and thiuram disulfide, the use of amide stabilizers being described in copending application, Serial No. 89,802, filed April 26, 1949.

The stabilizer chosen, which as noted above, may be one or a mixture of several compounds, can be incorporated in the reaction product in one or more of a number of different ways. Thus, for example, the stabilizer may be added to the solution of rubber or other polyunsaturated high molecular weight reactant before the same is brought into reactive engagement with the sulfur dioxide or other acidifying compound employed; alternatively, the stabilizer may be added to the medium containing the acidifying compound. The practice of either of the foregoing methods requires that the stabilizer be soluble, or at least dispersible, in the liquid medium present, and preferably it should in no way interfere with the desired reaction between the respective unsaturated and acidic compounds. Since some such interference may occur, particularly as the concentration of stabilizer is increased or the more alkaline stabilizers are employed, the preferred manner of adding the stabilizer is to bring a solution thereof into contact with the already formed reaction product, preferably when the latter is still in the swollen condition due to its manner of production in the coagulating bath and/or as a result of subsequent washing or soaking steps. Thus, filaments produced by spinning a solution of peroxide activated rubber into an ethanol-water-sulfur dioxide coagulating bath may thereafter be immersed in a solution of a stabilizer, as phenyl salicylate in water and/or ethanol, for example, and left therein for any desired period of time. Other appropriate solvents are acetone, propanol, butanol and methyl ethyl ketone. On being withdrawn from the stabilizer solution, the filaments may then be washed in the conventional manner, stretched, dyed, or otherwise treated, following which they may be dried and used. If desired, one or more of such washing, drying, stretching and/or dyeing steps may intervene between the actual precipitation of the filaments in the coagulating bath and their immersion in the stabilizer solution. Alternatively, the filaments may be treated in the dried (unswollen) condition, in which case the filaments are immersed in a solution of the desired stabilizing compound, preferably in a solvent such as benzene, ethyl alcohol, acetone or ethyl acetate which acts to swell the filament, though non-filament swelling solvents such as water may be employed in many cases. The stabilizers may also be applied otherwise than by impregnation. Thus, the material may be contacted with dispersions of stabilizers or with an atmosphere which contains the stabilizers in the vaporous or atomized state. In the latter case a solution of the stabilizer may be atomized, if desired.

The concentration of stabilizer to employ, whether the same be added to the unreacted materials, or is applied as a solution to the already formed reaction product, is not critical. Thus, good results are obtained with solutions containing from about 0.1 to 20% by weight of a stabilizer, and some improvement can be effected even when using smaller quantites than 0.1%. Preferably, however, the concentration of stabilizer should be at least 0.5% based on the entire weight of the solution, with concentrations of more than 10% seldom being justified in terms of improved results.

The period during which any given reaction product should be left in a stabilizer solution will vary depending on a number of circumstances. Thus, in the case of filaments and other small shapes the soaking period may be somewhat shorter than with articles of greater cross section. Again, with more concentrated stabilizer solutions the soaking period may be somewhat shortened. Another factor is the ease with which the reaction product is able to take up the stabilizer solution, freshly formed, undried products (i. e., swollen filaments) being considerably more receptive to the stabilizer solution than dried ones. In general, immersion periods of from 1 to 30 minutes are satisfactory with swollen filaments, though soaking periods of one or more hours are desirable when treating dried filaments. In all cases, extension of the soaking time is in no way harmful, and in many cases proves of considerable benefit. Where the stabilizer is added to the unreacted solution of rubber or sulfur dioxide, for example, no modification need be made in the normal process by which said compounds are reacted.

Of more importance than the duration of the treatment with stabilizer solution is the temperature thereof. It forms a feature of the present invention that improved results are obtained by immersing the reaction products to be treated in a heated stabilizer solution, by which term is meant a solution having a temperature of 50° C. or above, and preferably between 50° C. and 150° C. The use of such heated solutions serves in a measure to fix the stabilizer in the reaction product, thereby increasing its resistance to removal during aging or on exposure to heat or light, particularly following washing of the stabilizer-containing product.

Still further improved results, notably as regards increased stability following soap-washing and/or alkali-treating steps, are achieved by subjecting reaction products already impregnated with stabilizer to a treatment involving heating said products in a gaseous environment such as air or nitrogen. The temperatures employed in this heating step may range from about 50° C. to 250° C., though temperatures of from about 80° C. to 150° C. are preferred. Effective treatments carried out in the latter temperature range normally take from ½ to 4 or more hours, the relatively higher temperature permitting effective use of the shorter treating intervals. This so-called "dry" heating step may be practiced with beneficial results no matter whether the impregnation treatment referred to in the preceding paragraph be conducted at elevated temperatures or not, though as a general rule the one heating treatment re-enforces the other.

It has also been found that improved results as regards fixation of stabilizer may be obtained by utilizing stabilizer compounds such as mono-, di- and triallylphenyl salicylates which contain one or more alkenyl or other unsaturated, aliphatic groups. Such unsaturated stabilizing compounds are preferably introduced into a solution of rubber or other high molecular weight reactant prior to its reaction with the acidic compound if the full effect of the stabilization treatment is to be obtained, for its seems quite probable that under these circumstances the stabilizer enters into, and chemically forms a part of, the final reaction product.

The following examples illustrate the present invention in various of its embodiments:

EXAMPLE I

The improvement in resistance to deterioration under the influence of light obtained according to the invention was examined in the case of the reaction product of natural rubber with sulfur dioxide in the form of dried filaments having a sulfur content of 22% by weight. These filaments had been produced by spinning a solution of natural rubber and tetralin hydroperoxide into a sulfur dioxide-containing coagulating bath and thereafter stretching, washing and drying the filaments. In the following Table I this improvement is expressed in percentages of the tensile strength of those of the filaments which had not been stabilized and had not been exposed to light. The stabilizers were applied by soaking the filaments for four hours at 20° C. in a solution of the indicated stabilizer in ethanol, the concentration of the solution being indicated in the case of each stabilizer compound. After impregnation the filaments were cursorily rinsed in ethanol and dried at room temperatures. The filaments were then exposed at a distance of 80 cm. to the rays of a 800 w. Hanau lamp.

Table I

| Stabilizer | Concentration of Stabilizer Solution Per Cent | Tensile strength in per cent (blank=100) after irradiation during— | | |
|---|---|---|---|---|
| | | 0 hour | 17 hours | 34 hours |
| None | | 100 | 63 | 47 |
| Salicylic acid | 1 | 100 | 79 | |
| Phenyl salicylate | 1 | 100 | 87 | 75 |
| Phenyl salicylate | 4 | 100 | 96 | |
| Zinc diisopropyl-salicylate | 1 | 100 | 82 | 67 |

EXAMPLE II

In this operation other filaments prepared in the manner described in Example I above were soaked for four hours at 78° C. in a solution of 5% phenyl salicylate and 1% hexamethylene tetramine in ethanol. The influence of irradiation on the tensile strength was examined, while moreover a comparison was made between the results obtained with and without washing the impregnated thread prior to irradiation, the washing being effected with a 0.4% solution of soap for four hours at 60° C. Irradiation was carried out with ultraviolet light from two 125 W. Philips HP-500 lamps without glass bulbs, which lamps were placed at a distance of 55 cm. from the material to be tested.

Table II

| | Tensile strength in per cent (blank=100) after irradiation during— | | |
|---|---|---|---|
| | 0 hour | 17 hours | 34 hours |
| without stabilizer | 100 | 46 | 35 |
| stabilized, unwashed | 100 | 91 | 80 |
| stabilized and washed | 100 | 86 | 70 |

EXAMPLE III

In order to test the thermostabilizing properties of various salicylate compounds, filaments of the type described in Example I were soaked for 4 hours at 20° C. in the stabilizer solutions indicated in Table III below. Upon being removed from such solutions, the various lots of filaments were dried at room temperature and then heated in air for 2 hours at 125° C. The stability of the filaments was determined by measuring the amount of sulfur dioxide lost during this 2 hour heating step, this loss being expressed in the table as the percentage of the amount of sulfur dioxide lost by a like, non-stabilized filament under the same test conditions.

Table III

| Stabilizer and its Concentration in Ethanol Solution | $SO_2$ Split Off in Per Cent (blank= 100) during heating at 125° C. for hours |
|---|---|
| none | 100 |
| Zinc 3,5-diisopropyl-salicylate, 2% | 80 |
| Calcium 3,5-diisopropyl-salicylate, 2% | 85 |
| Calcium 3,5-diisopropyl-salicylate, 1%+ thiourea, 1% | 29 |

The invention claimed is:

1. The method of increasing the resistance to deterioration of a product formed on the reaction of natural rubber with sulfur dioxide, said method comprising incorporating zinc 3,5-diisopropylsalicylate in said product.

2. The method of increasing the resistance to deterioration of a product formed on the reaction of natural rubber with sulfur dioxide, said method comprising incorporating calcium 3,5-diisopropylsalicylate in said product.

3. The method of increasing the resistance to deterioration of a product formed on the reaction of natural rubber with sulfur dioxide, said method comprising incorporating phenyl salicylate in said product.

4. The method of increasing the resistance to deterioration of a product formed on the reaction of a natural rubber with sulfur dioxide, said method comprising incorporating in said product a stabilizer compound selected from the group consisting of salicylic acid, 3-phenylsalicylic acid, 3-ethylsalicylic acid, 3,5-diisopropylsalicylic acid, the esters of said acids, calcium salicylate, calcium 3-phenylsalicylate, calcium 3,5-diisopropylsalicylate, and magnesium salicylate.

5. The method of claim 4 wherein the incorporation of the stabilizer compound in said reaction product is effected by immersing the product in a heated solution of the compound.

6. The method of claim 4 wherein there is added the step of heating the stabilizer-containing product in a non-reactive gaseous environment.

7. The method of increasing the resistance to deterioration of a product formed on the reaction of sulfur dioxide with a rubbery polymer of at least one compound selected from the group consisting of the conjugated diolefins and chloroprene, said method comprising incorporating in said product at least one stabilizer compound selected from the group consisting of salicylic acid, 3-phenylsalicylic acid, 3-ethylsalicylic acid, 3,5-diisopropylsalicylic acid, the esters of said acids, calcium salicylate, calcium 3-phenylsalicylate, calcium 3,5-diisopropylsalicylate, and magnesium salicylate.

8. The method of claim 7 wherein said stabilizer compound is incorporated in said reaction product by immersing the product in a heated solution of the compound.

9. The method of claim 7 wherein there is added the step of heating the stabilizer-containing product in a non-reactive gaseous environment.

10. A novel composition of matter comprising a reaction product of a rubbery polymer of at least one compound selected from the group consisting of the conjugated diolefins and chloroprene with sulfur dioxide, which reaction product is impregnated with at least one stabilizer compound selected from the group consisting of salicylic acid, 3-phenylsalicylic acid, 3-ethylsalicylic acid, 3,5-diisopropylsalicylic acid, the esters of said acids, calcium salicylate, calcium 3-phenylsalicylate, calcium 3,5-diisopropylsalicylate, and magnesium salicylate, said impregnated reaction product being charactericterized by a high resistance to deterioration on exposure to ultraviolet light.

11. The composition of claim 10 wherein the polyunsaturated compound is natural rubber and the stabilizing compound is zinc 3,5-diisopropylsalicylate.

12. The composition of claim 10 wherein the polyunsaturated compound is natural rubber and the stabilizing compound is calcium 3,5-diisopropylsalicylate.

13. The composition of claim 10 wherein the polyunsaturated compound is natural rubber and the stabilizing compound is phenyl salicylate.

14. In a method whereby a solution of a rubbery polymer of at least one compound selected from the group consisting of the conjugated diolefins and chloroprene is injected into a coagulating bath containing available sulfur dioxide wherein the injected rubbery polymer reacts with the sulfur dioxide to form a swollen filamentary shape, the step comprising impregnating said swollen shape with a solution containing at least one stabilizer compound selected from the group consisting of salicylic acid, 3-phenylsalicylic acid, 3-ethylsalicylic acid, 3,5-diisopropylsalicylic acid, the esters of said acids, calcium salicylate, calcium 3-phenylsalicylate, calcium 3,5-diisopropylsalicylate, and magnesium salicylate.

15. The article produced by the method of claim 14.

JOHAN MICHAEL GOPPEL.
GOTTFRIED ERNST RUMSCHEIDT.

REFERENCES CITED

The following references are of record in the file of this patent:

UNITED STATES PATENTS

| Number | Name | Date |
| --- | --- | --- |
| 2,167,381 | Winkelmann et al. | July 25, 1939 |
| 2,364,089 | Mitchell | Dec. 5, 1944 |
| 2,379,354 | Hilton | June 26, 1945 |
| 2,469,847 | Rumscheidt et al. | May 10, 1949 |